United States Patent
Cordery et al.

(10) Patent No.: US 8,078,539 B2
(45) Date of Patent: Dec. 13, 2011

(54) METHOD AND SYSTEM FOR SORTING CHECKS ACCORDING TO A PRIORITY ORDER ASSOCIATED WITH THE ACCOUNT NUMBER

(75) Inventors: Robert A. Cordery, Danbury, CT (US); Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 2612 days.

(21) Appl. No.: 10/714,802

(22) Filed: Nov. 17, 2003

(65) Prior Publication Data

US 2005/0108167 A1    May 19, 2005

(51) Int. Cl.
*G06Q 40/00* (2006.01)

(52) U.S. Cl. ............................ 705/45; 382/137; 235/375

(58) Field of Classification Search .................... 705/45
See application file for complete search history.

(56) References Cited

U.S. PATENT DOCUMENTS

| | | | | |
|---|---|---|---|---|
| 3,949,363 | A * | 4/1976 | Holm | 382/140 |
| 4,088,982 | A * | 5/1978 | Haas | 382/137 |
| 4,315,246 | A * | 2/1982 | Milford | 382/140 |
| 5,287,497 | A * | 2/1994 | Behera | 707/104.1 |
| 5,602,936 | A * | 2/1997 | Green et al. | 382/140 |
| 5,734,568 | A * | 3/1998 | Borgendale et al. | 700/224 |
| 6,059,185 | A * | 5/2000 | Funk et al. | 235/379 |
| 6,574,377 | B1 * | 6/2003 | Cahill et al. | 382/305 |
| 6,576,857 | B1 * | 6/2003 | De Leo et al. | 209/584 |

OTHER PUBLICATIONS

Bantec's New X-Series Cuts Passes in Reject-Repair. Item Processing Report. Feb. 24, 2000. vol. 11, Iss. 4; p. 1.*
Document Tracking in the electronic filing cabinet. Banker's Monthly. Jan. 1993; vol. 110, issue 1; p. 22.*
Automating the mail: Illinois bank cuts backroom costs significantly. Gave McOlgan, John Travis. Bank News; Mar. 2005. vol. 105, Issue 3, p. 24.*

* cited by examiner

*Primary Examiner* — Alexander Kalinowski
*Assistant Examiner* — John Preston
(74) *Attorney, Agent, or Firm* — Brian A. Lemm; Charles R. Malandra, Jr.; Steven J. Shapiro

(57) ABSTRACT

An improved check sorting system capable of ordering cancelled checks for a plurality of accounts in a predetermined manner other than by account number is provided. Checks are ordered according to a priority value associated with the account number, and optionally check number, identified by each check. A database is utilized to store information indexed by institution and/or account number and optionally check number. The information includes a priority value. The check sorting system scans each check and reads the MICR code from each check. The institution and/or account number, and possibly check number, from each check are used as pointers to obtain the priority value for that check. The check is then sorted based on the priority value obtained from the database.

26 Claims, 2 Drawing Sheets

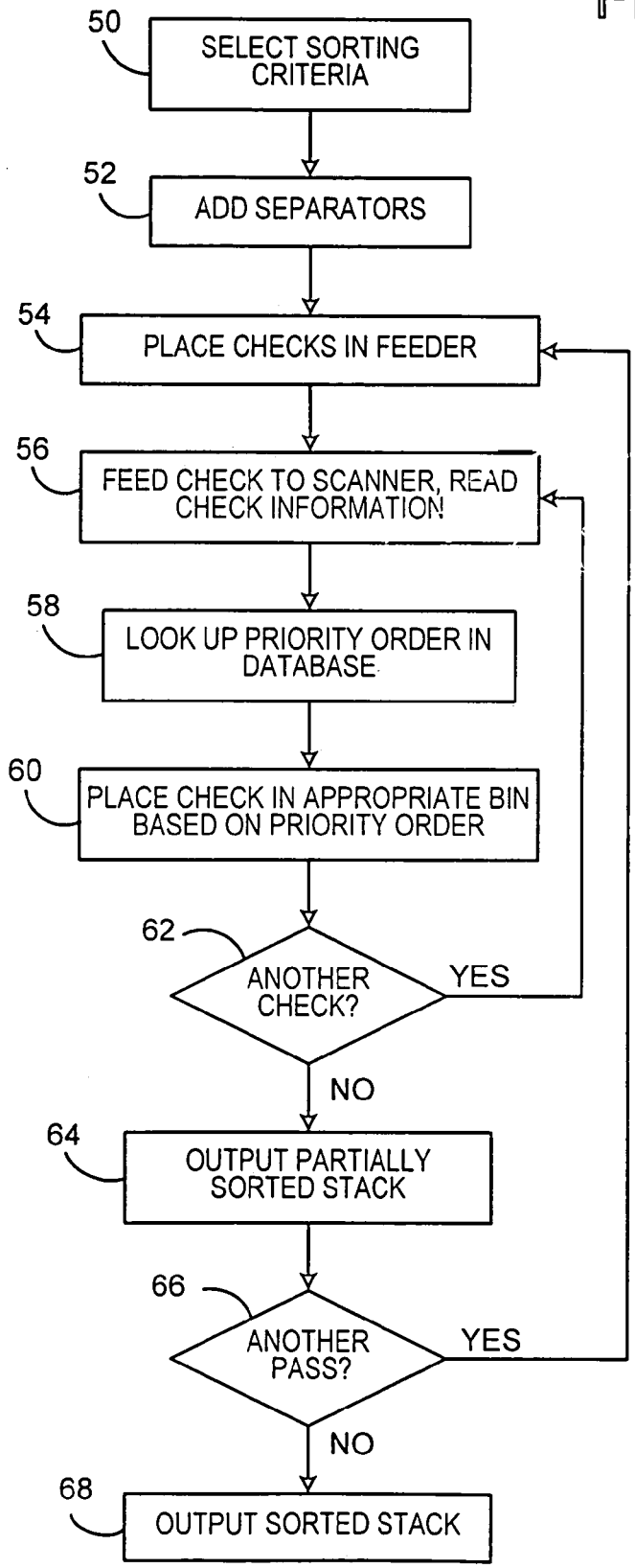

METHOD AND SYSTEM FOR SORTING CHECKS ACCORDING TO A PRIORITY ORDER ASSOCIATED WITH THE ACCOUNT NUMBER

FIELD OF THE INVENTION

This invention relates generally to document processing systems, and more particularly, to a system and method for sorting checks according to a priority order number associated with an account number identified by each check.

BACKGROUND OF THE INVENTION

Several methods are currently available for a purchaser of goods and/or services to pay the provider of the goods and/or services, including, for example, cash or check. A check, as is well known, is a written order to a bank to pay the stated amount of money from a specified account to the payee named on the check. Checks are generally more secure than cash, and as such are used extensively for payment in situations where large amounts of money are being paid or the payment is being sent through the mail. As such, banks must process tens of thousands of checks every month.

The processing and clearing of a check can be generally described as follows. Suppose, for example, a buyer pays a seller for goods with a check drawn on an account the buyer maintains with the buyer's bank. The buyer drafts the check with the seller as the named payee. The seller presents the check to the seller's bank (which may or may not be the same bank as the buyer's bank). The seller's bank, referred to as the "drawer" or "presenting" bank, sends the check to the buyer's bank. When the buyer's bank, also referred to as the "payor" bank receives the check, it determines whether enough funds are available in the buyer's account upon which the check is drawn to cover payment of the check, and either accepts or rejects payment of the check. Alternatively, the seller's bank can send the check to a check clearing house, which then communicates with the buyer's bank (typically electronically) to obtain acceptance or rejection of payment for the check. Once the payor bank accepts payment of the check, payment for the amount of the check is made to the presenting bank through a settlement process.

Banks are generally required to provide their account holders with monthly statements detailing the recent account activity. Some account statements include cancelled checks, i.e., checks that have been presented for payment and for which payment has been made. Thus, all checks presented during a specified time period are retained, either by the bank or the check clearing house. At the end of the time period, the checks are sorted, typically using high-speed sorter equipment, based on the information contained in a line of characters at the bottom of each check. These characters, known as a Magnetic Ink Character Recognition (MICR) code, indicate the bank at which the account is maintained via a routing number, the account number and the check number for each check. If the sorting is being performed by a check clearing house for a plurality of banks, this results in the checks being sorted by institution, i.e., bank. Optionally, the checks could be further sorted by account and check number for each account. As the checks are separated by account number for each bank, separators are typically inserted into the stack of checks to separate the checks for different accounts. The sorted checks are then sent to the respective banks for preparation and mailing of the account statements. Similarly, if a check clearing house only, sorts the checks by institution or is not utilized, then the bank must sort the checks by account number (and possibly by check number for each account) utilizing high speed sorting equipment to read the MICR code on each check. As the checks are separated by account number, separators are typically inserted into the stack of checks to separate the checks for different accounts. The sorted checks are then prepared for mailing with account statements.

Regardless of where or by whom the sorting is performed, once the checks have been sorted by account number, the bank will prepare the account statements. The account statements for these checks are prepared in account order, and the sorted checks are matched with the appropriate account statement for mailing to the account holders. Thus, the mailing for the account statements is produced and ordered based on account number.

There are problems, however, with the processing of the account statements as described above. As noted, the only way the checks can be sorted automatically based on the information printed in the MICR code is by institution and account number. Many banks, however, may have the need or desire to sort the checks based on a different criteria. Using the conventional technology, however, this is not possible without adding additional steps and costs to the processing of the checks. For example, postal authorities, such as the U.S. Postal Service (USPS), provide postage discounts for mail that is presorted based on delivery destination. In the United States, for example, the discounts increase with the granularity to which the mail is sorted along delivery routes. A first level discount is provided if mail is presorted to the first three digits of the destination zip code, a second level discount, greater than the first, is provided if mail is presorted to the first five digits of the destination zip code, and a third level discount, greater than the first two levels, is provided if mail is presorted to a particular mail carrier's delivery route. The amount of postage a financial institution must pay to send the account statements each month can be a considerable expense, especially for large banks that have tens of thousands of customers. Thus, any decrease in the amount of postage required to send the account statements each month could provide a significant savings. As noted above, however, the mailing for the account statements is produced and ordered based on account numbers. To take advantage of the postage discounts, many banks must utilize either a presort service or obtain additional equipment to reorder the mailing, after it has been sorted by account number, based on delivery destination. This reordering step increases the cost (thereby reducing or even negating the postage discount), adds unnecessary delay to the mailing, and adds another process into the mail preparation that can damage the mail pieces, or even worse, result in mail pieces being lost.

Therefore, there exists a need for improved sorting systems capable of ordering cancelled checks for a plurality of accounts in a desired order other than by the account number. For example, there is a need for a system capable of sorting checks in a manner that allows banks to take advantage of postal discounts without adding additional costs or processing in the preparation of the mail pieces that include the account statements and cancelled checks.

SUMMARY OF THE INVENTION

The present invention provides an improved check sorting system capable of ordering cancelled checks for a plurality of accounts in a predetermined manner other than by account number. By utilizing the sorting system of the present invention, for example, banks can take advantage of postal discounts available for presorted mail without adding additional costs or processing in the preparation of the mail pieces that include the account statements and cancelled checks.

In accordance with the present invention, checks are ordered according to a priority value associated with the account number, and optionally check number, identified by each check. A database is utilized to store information indexed by institution and/or account number and optionally check number. The information includes a priority value, such as, for example, postal codes, or other priority value data. The check sorting system scans each check and reads the MICR code from each check. The institution and/or account number, and possibly check number, from each check are used as pointers to obtain the priority value for that check. The check is then sorted based on the priority value obtained from the database. By using the priority value instead of the account number to sort the checks, the checks can be sorted in any desired order, thereby allowing the banks, for example, to take advantage of postal discounts without having to perform additional processing.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

FIG. 2 illustrates in flow chart form the sorting of checks according to the present invention.

DETAILED DESCRIPTION OF THE PREFERRED EMBODIMENTS

Figure 1:
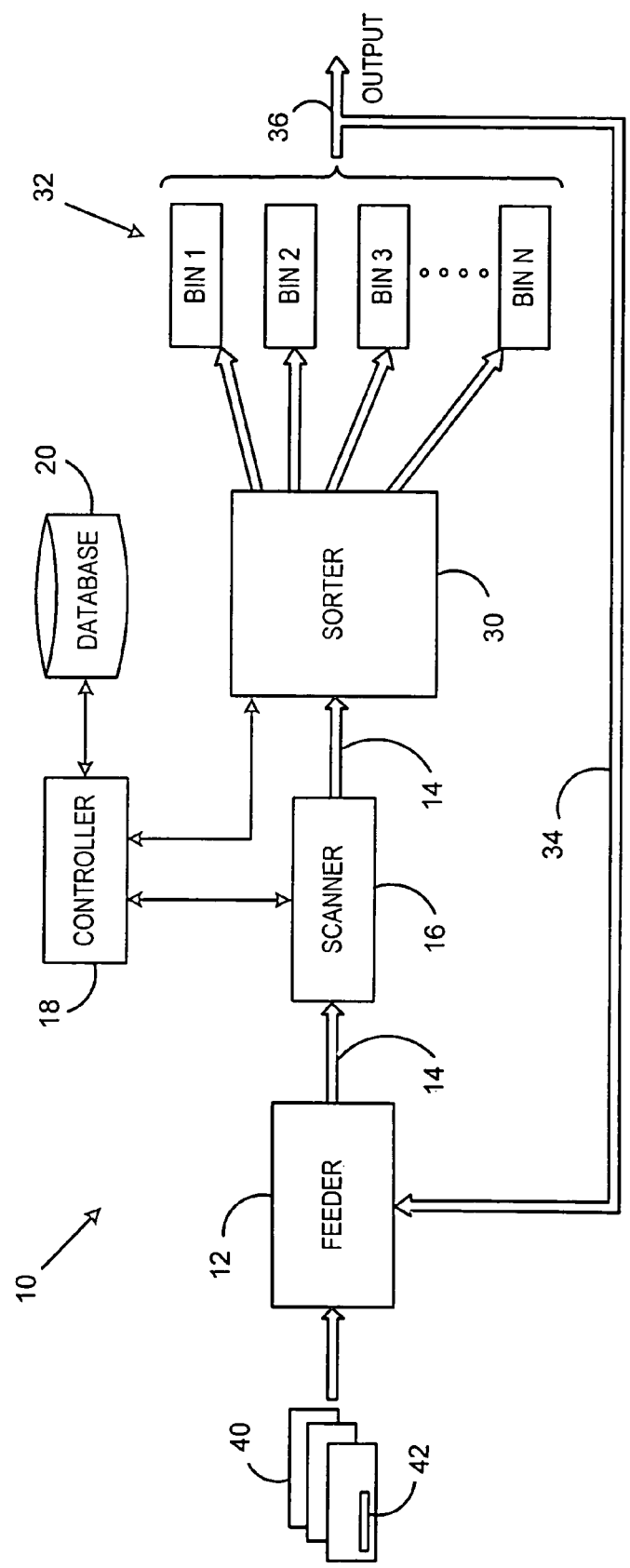
FIG. 1 is a block diagram of a system for sorting checks according to the present invention.

Referring to FIG. 1, a block diagram of a system 10 for sorting checks according to the present invention is generally shown. System 10 can be located at a financial institution, check clearing house, or other third party that processes checks for financial institutions. The system 10 includes an input feeder module 12 into which a plurality of checks 40, each having an MICR code 42 that indicates a routing number associated with the bank at which the account is maintained, the account number and the check number. Feeder module 12 operates to singulate the plurality of checks 40 such that they are fed seriatim along a transport path, designated by arrow 14, to a scanner module 16. The scanner module 16, which can be, for example, an MICR scanner or an optical character recognition (OCR) scanner, scans each check 40 and reads the MICR code 42 from each check 40. Additional information may also be scanned, such as, for example, the amount of the check, payee, etc. The data obtained from each check 40 is provided to a controller 18. Controller 18 includes a processing system, such as, for example, a general or special purpose computer or the like, and provides the main control for the functioning of system 10.

System 10 further includes a database 20 coupled to the controller 18. Database 20 is utilized to store sort priority order number records associated with each account, as further described below, that are utilized by controller 18 in conjunction with one or more sorting algorithms to determine the sort order for the checks 40 being processed by the system 10. After being read by the scanner 16, the checks 40 are passed, via transport path 14, to a sorter 30. Sorter 30 includes a plurality of different bins 32 used for sorting the checks 40. The sorter 30 will place each check 40 into a selected one of the plurality of bins 32 based on the sort priority order number specified by the controller 18. It should be noted that the controller 18, while shown as being separate from the sorter 30, may be integral with the sorter 30.

The sorting of the checks 40 into the desired order may take multiple passes through the system 10. As such, once all of the checks 40 have been passed through the system 10 and placed into a selected one of the bins 32, the checks 40 in one or more of the bins 32 may be combined into a new stack and fed back into the feeder 12 via transport path 34. Such combining and feeding can be performed either manually or automatically. The number of passes necessary to sort the checks 40 is, of course, dependent upon, among other things, the number of bins 32, the number of checks 40, the number of accounts, and the degree of granularity to which the checks 40 are sorted. Once the sorting has, been completed, i.e., the checks 40 have been passed through the system 10 a number of times necessary such that they are in the desired order, the sorted checks 40 are output from the system 10 at the output 36.

The priority order number contained within the sort priority order records in database 20 can be based on any one or more desired criteria. Each account number, and optionally specific check numbers, for each financial institution has at least one associated priority order number. Utilizing the institution number and/or account number, and optionally the check number, read from each check as a pointer, a desired priority order number for sorting each check can be found within the database 20. Thus, the checks 40 can be sorted based on any desired criteria. For example, the priority order number for the sort can be based on the customer's zip code, i.e., the zip code where the account statement will be mailed. The priority order could be based on the first three digits of the zip code, the full five digits of the zip code, or the "zip+4" number, depending upon the granularity of the sort desired. In general, the priority order number does not need to be larger than the number of accounts, but may be.

As another example, the priority order number could be based on how the checks 40 are to be physically processed. For example, some customers want to receive the actual cancelled checks 40, while others may prefer to receive only images of the cancelled checks 40, while others may prefer to receive just the data from the checks 40, i.e., check number, payee, amount and date. Customers that do not usually receive the actual cancelled checks may wish to receive a particular check for evidence of payment or for their own personal records. Thus, the system 10 can separate and sort the checks 40 based on what the customer desires to receive with the account statement. For example, the customer may only desire to receive checks for certain amounts or to specific payees or types of payees. Thus, the sort priority order number could be based on the amount of the check, i.e., the monetary amount indicated in the courtesy field or the legal amount field, or the payee or type of payee, i.e., business payee, individual payee, etc. As another example with respect to physical processing, the priority order number could be based upon the need to treat particular accounts or even checks separately, such as, for example, in the case of investigations being performed by the bank or governmental agency. The priority order number could also be based on the type of account. For example, commercial accounts may have specific deadlines that need to be met for accounting purposes, and therefore must be separated from personal accounts.

The database 20 thus contains one or more of the possible sorting criteria that will be available for sorting the checks. As noted above, every account has at least one associated priority order number. If multiple priority order numbers are provided, then each of the multiple priority order numbers can have a rank such that the system can determine when one of the priority order numbers will take precedence over another. For example, if checks are being sorted based on destination address of the account statement, but some accounts have a check processing instruction that the actual cancelled checks will not be returned, then the priority order number for the check processing instruction will take precedence and the checks will be placed in a separate discard bin instead of the bin specified by the destination address.

Operation of the system 10 according to the present invention will now be described with respect to the flow chart of FIG. 2. Suppose, for example, a bank desires to sort and separate all the paid checks it received in the past month. The bank desires that the sort order be based on delivery destination, i.e., zip code, of the account statements for each account that will accompany the sorted checks, thereby presorting the mailing. In addition, the bank desires to separate checks that do not need to be returned to the customer, or are subject to an account that is under investigation. In step 50, the sorting criteria desired is selected and entered into the system 10. Such entry could be, for example, via an input device (not shown) coupled to the controller 18. As noted above, since there are multiple sort criteria selected, each of the criteria will be ranked with respect to the other to determine which criteria takes precedence over the others. Additionally in step 50, the sorting system 10 will be initialized based on the selected sorting criteria, the number of bins 32 available, and the sorting algorithm that will be used to process the sort. Such initialization includes, for example, allocating the bins 32 to receive the checks as they are sorted. For example, in the above scenario, at least one bin 32 can be allocated to receive checks that will be discarded, i.e., not returned to the account holder, while another bin 32 can be allocated to receive checks drawn on an account under investigation.

In step 52, separators are added to the unsorted batch of checks. The separators could be, for example, pieces of colored paper, having a size similar to that of the checks, that include an MICR code to identify each account held at the bank. The separators could include within the MICR code an identification as a separator such that it will always be placed as the first item in a stack for each account. For example, the separators could be provided with a check number of, zero, such that if the checks are sorted by check number, the separators will be the first item in a stack for each account.

In step 54, the checks are placed in the feeder 12 of the system 10. In step 56, a check or separator, hereinafter referred to collectively as check, is removed from the stack of checks in the feeder 12, and transported to the scanner 16. The scanner 16 reads data on the check, including the MICR code, and provides the information read from the check to the controller 18. In step 58, the controller, using the information provided by the scanner 16, queries the database 20 to obtain the priority order number for the check. Thus, based on the data from the check 40, e.g., account number and possibly the check number, the priority order number for the check, as selected in step 50, is obtained. The controller 18 provides the priority order number for the check to the sorter 30, or alternatively provides control signals to the sorter 30, such that in step 60 the check is placed in the appropriate bin 32 based on the priority order number according to the sorting algorithm being used. For example, one type of sort algorithm that can be used by the system 10 is a radix sort, which can be used to sort items that are identified by keys, i.e., the priority order number. Thus, the priority order number is a character string or number, and radix sorts these in a particular lexicographic-like order. For example, if the priority order number is a-five-digit zip code, the checks will be sorted based on the zip code (and thus be placed in postal presort order). If the priority order number further includes the account number, the checks will be further sorted by account number (thereby separating all of the checks into their respective accounts). If the priority order number further includes the check number, then the checks will be further sorted based on the check number.

In general, a radix sort works by representing each key for each item in a number system with radix B, the number of available bins. The available bins B are labeled with natural numbers from 0 to B-1. The sort proceeds by taking the least significant digit of the base B representation of the key for each item, and placing the item in the corresponding bin. The sorted items are then recombined with bin 0 first and bin B-1 last, and maintaining the order within each bin. This process is then repeated for each more significant digit of each key. It should be understood, of course, that the present invention is not limited to the use of a radix sort and other sorting algorithms could also be utilized.

For those accounts where the checks are not to be returned, the priority order number could include a fictitious zip code, for example, 00000 or 99999, and all checks having this priority order number could be placed in the bin allocated for checks to be discarded. Similarly, for those accounts that are the subject of an investigation, a different fictitious zip code could be utilized within the priority; order; number, and all checks having this priority order number could be placed in a bin allocated for accounts under investigation. Thus, by utilizing the database 20 and the stored priority order number associated with each check therein, check sorting system 10 of the present invention is capable of ordering cancelled checks for a plurality of accounts in any predetermined manner as desired utilizing the sorter 30.

In step 62, it is determined if another check is present to be read by the scanner 16. If another check is present, then in step 56 the scanner 16 reads the MICR code on the check and provides the information read from the check to the controller 18. In step 58, the controller, using the information provided by the scanner 16, queries the database 20 to obtain the priority order number for the check, and the controller 18 provides the priority order number for the check to the sorter 30, or alternatively provides control signals to the sorter 30, such that in step 60 the check is placed in the appropriate bin 32 basedon the priority order according to the sorting algorithm being used.

If in step 62 it is determined that there is not another check, then in step 64 the partially sorted stack is output from the system 10. The partially sorted stack could include, for example, the checks from one or more of the bins 32 aggregated into a single stack. For example, the partially sorted stack need not include those checks from the bin 32 allocated for checks to be discarded, or checks that are drawn on an account under investigation. In step 66 it is determined if another pass of the partially sorted stack through the system 10 is necessary, i.e., it is determined if the sorting has been completed. If the sorting has not been completed, then another pass of the checks through the system 10 is necessary and the partially sorted stack of checks is put back into the feeder 12 (step 54) via transport path 34 to be processed again as described above. Optionally, the bins 32 of the system 10 could be re-allocated at this point. For example, if all of the checks to be discarded were sorted into a specified bin 32 on the first pass, then the bin 32 originally allocated to receive those checks can be re-allocated, as there will no longer be any checks to be discarded on the second pass through. If it is determined in step 66 that the sorting has been completed, then the partially sorted stack is deemed to be the completely sorted stack and in step 68 is output from the system 10 via transport path 36.

Based on the above description and the associated drawings, it should now be apparent that the present invention improves many aspects of the sorting process for checks. According to the present invention, an improved check sorting system capable of ordering cancelled checks for a plurality of accounts in a predetermined manner other than by account number is provided. However, those skilled in the art will recognize that various modifications and adaptations can be made without departing from the spirit of the present invention. Therefore, the inventive concept in its broader aspects is not limited to the specific details of the preferred embodiments described above, but is defined by the appended claims and their equivalents.

What is claimed is:

1. A method for sorting a plurality of checks using a check sorting system comprising:
   reading information from a check of the plurality of checks using a scanner module of the check sorting system, the check being drawn against an account maintained by a customer at a financial institution;
   providing the information read from the check to a controller of the check sorting system;
   obtaining, by the controller, a sort priority order number for the check from a database using at least a portion of the information read from the check, the sort priority order number being based on a delivery location specified by the customer for an account statement associated with the account;
   sorting, using a sorter of the check sorting system, the check into one of a plurality of bins based on the sort priority order number obtained from the database; and
   repeating the reading, obtaining and sorting steps for each of the plurality of checks.

2. The method of claim 1, wherein reading information from the check further comprises:
   reading a routing number associated with the financial institution from the check.

3. The method of claim 1, wherein reading information from the check further comprises:
   reading a number of the account upon which the check is drawn from the check.

4. The method of claim 1, wherein reading information from the check further comprises:
   reading a check number from the check.

5. The method of claim 1, wherein the sort priority order number is further based on a type of account associated with the check.

6. The method of claim 1, wherein the sort priority order number is further based on processing for the check specified by the customer.

7. The method of claim 6, wherein processing for the check includes whether or not the check will be included with the account statement associated with the account.

8. The method of claim 1, wherein the sort priority order number is further based on an amount of the check.

9. The method of claim 1, wherein the sort priority order number is further based on a payee of the check.

10. The method of claim 1, wherein reading information from the check further comprises:
    placing the plurality of checks in a feeder;
    separating the check from the plurality of checks; and
    scanning the check to read the information.

11. The method of claim 1, wherein sorting the check further comprises:
    placing the check in an appropriate bin based on the sort priority order number.

12. The method of claim 1, wherein obtaining a sort priority order number for the check further comprises:
    using at least a portion of the information read from the check as a pointer to obtain the sort priority order number for the check from the database.

13. The method of claim 1, wherein the plurality of checks include separators.

14. A system for sorting a plurality of checks, each of the checks being drawn against an account maintained by a respective customer at a financial institution, the system comprising:
    a scanner module to read information from a check;
    a controller coupled to the scanner, the controller receiving the information read from the check by the scanner;
    a database coupled to the controller, the database storing sort priority order numbers for the plurality of checks, the sort priority order number for each check being based on a delivery location specified by the respective customer for an account statement associated with the account maintained by the respective customer, the controller obtaining the sort priority order number for the check from the database using at least a portion of the information read from the check; and
    a sorter coupled to the controller, the sorter receiving the check from the scanner and placing the check into one of a plurality of bins based on the sort priority order number obtained from the database.

15. The system of claim 14, wherein the controller is integral with the sorter.

16. The system of claim 14, wherein the information read from the check includes a routing number associated with the financial institution where the account is maintained by the customer.

17. The system of claim 14, wherein the information read from the check includes a number of the account upon which the check is drawn.

18. The system of claim 14, wherein the information read from the check includes a check number.

19. The system of claim 14, wherein the sort priority order number is further based on a type of account associated with the check.

20. The system of claim 14, wherein the sort priority order number is further based on processing for the check specified by the customer.

21. The system of claim 20, wherein processing for the check includes whether or not the check will be included with the account statement associated with the account.

22. The system of claim 14, wherein the sort priority order number is further based on an amount of the check.

23. The system of claim 14, wherein the sort priority order number is further based on a payee of the check.

24. The system of claim 14, further comprising:
a feeder module coupled to the scanner module, the feeder module receiving the plurality of checks and feeding the plurality of checks seriatim to the scanner module.

25. The system of claim 14, wherein the scanner module is a magnetic ink character recognition scanner.

26. The system of claim 14, wherein the scanner module is an optical character recognition scanner.

* * * * *